(12) United States Patent
Huebner

(10) Patent No.: US 10,844,828 B2
(45) Date of Patent: Nov. 24, 2020

(54) WATER POWERED MOTOR FOR PRODUCING USEFUL WORK

(71) Applicant: Robert L. Huebner, Santa Anna, TX (US)

(72) Inventor: Robert L. Huebner, Santa Anna, TX (US)

(*) Notice: Subject to any disclaimer, the term of this patent is extended or adjusted under 35 U.S.C. 154(b) by 0 days.

(21) Appl. No.: 15/971,673

(22) Filed: May 4, 2018

(65) Prior Publication Data

US 2018/0252199 A1 Sep. 6, 2018

Related U.S. Application Data

(63) Continuation-in-part of application No. 15/830,741, filed on Dec. 4, 2017, now abandoned, which is a continuation-in-part of application No. 15/170,346, filed on Jun. 1, 2016, now abandoned.

(51) Int. Cl.
  *F03B 13/06* (2006.01)
  *F03B 7/00* (2006.01)
  *F03B 17/00* (2006.01)

(52) U.S. Cl.
  CPC .............. *F03B 13/06* (2013.01); *F03B 7/003* (2013.01); *F03B 17/005* (2013.01); *F05B 2220/706* (2013.01); *F05B 2230/232* (2013.01); *F05B 2240/241* (2013.01); *F05B 2240/91* (2013.01); *F05B 2240/941* (2013.01);
  (Continued)

(58) Field of Classification Search
  CPC ........ F03B 13/06; F03B 7/003; F03B 17/005; Y02P 70/50; Y02E 10/20; Y02E 60/16; F05B 2220/706; F05B 2230/232; F05B 2240/241; F05B 2240/91; F05B 2240/941; F05B 2260/503

USPC .......................... 290/43, 52, 53, 54; 60/398; 404/100–109
  See application file for complete search history.

(56) References Cited

U.S. PATENT DOCUMENTS

| 2,083,767 A | * | 6/1937 | Yett | ........................ B28C 5/4231 366/34 |
| 3,773,434 A | | 11/1973 | Mason | |
| 3,880,552 A | | 4/1975 | Mason | |

(Continued)

FOREIGN PATENT DOCUMENTS

CA 2741730 A1 11/2012

OTHER PUBLICATIONS

Alternative Energy Tutorials; Waterwheel Design; 4 pages; copyright 2010-2014 www.alternative-energy-tutorials.com/hydro-energy/waterwheel-design.

*Primary Examiner* — Pedro J Cuevas
(74) *Attorney, Agent, or Firm* — Whitaker Chalk Swindle & Schwa; Charles Gunter

(57) ABSTRACT

A water driven power generating system has a frame with a waterwheel carried within the frame in an upright manner having a plurality of water receiving elements for turning the waterwheel. A water discharge manifold is used to discharge water from a supply tank onto the water receiving elements. The water supply tank is supplied with water from an adjacent water reservoir, such as a stock tank. After passing over the water receiving elements of the water wheel, the discharge water is allowed to flow back to the water reservoir by gravity. The water used in the system is pumped from the reservoir to the supply tank by a truck mounted pump which is powered by the power take-off of the truck.

9 Claims, 6 Drawing Sheets

(52) U.S. Cl.
CPC ......... *F05B 2260/503* (2013.01); *Y02E 10/20* (2013.01); *Y02E 60/16* (2013.01); *Y02P 70/50* (2015.11)

(56) References Cited

U.S. PATENT DOCUMENTS

| | | | | |
|---|---|---|---|---|
| 4,132,901 A * | 1/1979 | Crausbay | ............. | F03B 13/145 |
| | | | | 290/53 |
| 4,204,356 A | 5/1980 | Smith | | |
| 4,241,283 A | 12/1980 | Storer, Sr. | | |
| 4,260,902 A | 4/1981 | Crider | | |
| 4,345,160 A | 8/1982 | Smith | | |
| 4,385,497 A | 5/1983 | Scott | | |
| RE31,449 E | 11/1983 | Crider | | |
| 4,423,980 A * | 1/1984 | Warnock | ............... | E01C 19/174 |
| | | | | 296/37.6 |
| 4,443,707 A | 4/1984 | Scieri et al. | | |
| 4,514,977 A | 5/1985 | Bowen | | |
| 4,971,092 A * | 11/1990 | Parry | ...................... | F16K 35/14 |
| | | | | 137/351 |
| 5,006,012 A * | 4/1991 | Sterner | ................... | E01C 19/21 |
| | | | | 404/107 |
| 5,049,080 A | 9/1991 | Kriebel et al. | | |
| 5,232,306 A * | 8/1993 | Sterner | ................... | E01C 23/06 |
| | | | | 404/107 |
| 5,755,553 A | 5/1998 | Laemthongsawad | | |
| 5,789,826 A * | 8/1998 | Kumbatovic | ....... | F03B 13/1835 |
| | | | | 290/53 |
| 5,905,312 A | 5/1999 | Liou | | |
| 6,029,688 A | 2/2000 | Kaufman | | |
| 6,051,892 A | 4/2000 | Toal, Sr. | | |
| 6,210,113 B1 | 4/2001 | Ihrenberger | | |
| 6,359,347 B1 | 3/2002 | Wolf | | |
| 6,616,403 B1 | 9/2003 | Smith et al. | | |
| 6,776,557 B2 * | 8/2004 | Barnat | ..................... | E01C 19/21 |
| | | | | 404/101 |
| 6,805,516 B2 * | 10/2004 | Barnat | ..................... | E01C 19/21 |
| | | | | 404/101 |
| 6,861,766 B2 | 3/2005 | Rembert | | |
| 7,003,955 B2 * | 2/2006 | Davis | ..................... | E02B 9/00 |
| | | | | 60/641.11 |
| 7,222,487 B1 | 5/2007 | Hinkley | | |
| 7,239,035 B2 | 7/2007 | Garces et al. | | |
| 7,290,307 B1 * | 11/2007 | Chao | ........................ | E01H 1/103 |
| | | | | 15/322 |
| 7,478,811 B2 | 1/2009 | Johnson | | |
| 7,944,078 B1 | 5/2011 | Wang | | |
| 7,969,034 B2 | 6/2011 | Winius | | |
| 8,008,796 B2 | 8/2011 | Muchow | | |
| 8,030,790 B2 | 10/2011 | Kamenov | | |
| 8,044,530 B2 | 10/2011 | Harris | | |
| 8,058,741 B1 | 11/2011 | Echemendia | | |
| 8,127,542 B1 | 3/2012 | Dolcimascolo | | |
| 8,307,640 B1 | 11/2012 | Callen | | |
| 8,382,425 B2 * | 2/2013 | Griffin | .................... | F03D 15/00 |
| | | | | 415/126 |
| 8,492,918 B1 | 7/2013 | Kamenov | | |
| 8,564,151 B1 | 10/2013 | Huebner | | |
| 8,643,206 B2 * | 2/2014 | Ekern | ..................... | F03B 13/06 |
| | | | | 290/52 |
| 8,766,469 B2 | 7/2014 | Payre et al. | | |
| 8,841,793 B2 * | 9/2014 | Wang | ..................... | F03B 17/063 |
| | | | | 290/54 |
| 9,194,360 B2 | 11/2015 | Payre et al. | | |
| 9,199,267 B2 * | 12/2015 | Bandura | ................ | B05B 9/002 |
| 9,592,526 B2 * | 3/2017 | Bandura | ................ | B05B 9/002 |
| 9,593,665 B2 | 3/2017 | Santana | | |
| 10,666,174 B2 * | 5/2020 | Bergman | ................ | F03B 7/003 |
| 2003/0127860 A1 | 7/2003 | Baron | | |
| 2003/0167760 A1 | 9/2003 | Jackson | | |
| 2005/0034452 A1 * | 2/2005 | Davis | ....................... | E02B 9/00 |
| | | | | 60/398 |
| 2005/0052028 A1 | 3/2005 | Chiang | | |
| 2007/0018461 A1 | 1/2007 | Hardy | | |
| 2008/0238104 A1 | 10/2008 | Dale | | |
| 2008/0253837 A1 | 10/2008 | Miller | | |
| 2009/0160192 A1 | 6/2009 | Chen | | |
| 2010/0072754 A1 | 3/2010 | Huang | | |
| 2010/0207394 A1 | 8/2010 | Leung | | |
| 2010/0259044 A1 | 10/2010 | Muchow | | |
| 2010/0327597 A1 * | 12/2010 | Patel | ..................... | F03B 17/063 |
| | | | | 290/54 |
| 2011/0006533 A1 * | 1/2011 | Seymour | ............... | F03B 17/063 |
| | | | | 290/54 |
| 2011/0080002 A1 * | 4/2011 | Santana | ................ | F03B 17/005 |
| | | | | 290/54 |
| 2011/0179787 A1 * | 7/2011 | Griffin | ...................... | F03B 7/00 |
| | | | | 60/639 |
| 2011/0204627 A1 | 8/2011 | Ho et al. | | |
| 2011/0204645 A1 | 8/2011 | Jacobson | | |
| 2012/0001433 A1 | 1/2012 | Mowad | | |
| 2012/0019004 A1 * | 1/2012 | Ekern | ..................... | F03B 13/06 |
| | | | | 290/53 |
| 2012/0074703 A1 | 3/2012 | Lin | | |
| 2012/0169061 A1 | 7/2012 | Lee et al. | | |
| 2012/0274070 A1 | 11/2012 | Payre et al. | | |
| 2013/0017336 A1 * | 1/2013 | Bandura | ................ | B05B 9/002 |
| | | | | 427/422 |
| 2013/0307272 A1 | 11/2013 | Smith | | |
| 2014/0246860 A1 | 9/2014 | Payre et al. | | |
| 2014/0349006 A1 * | 11/2014 | Bandura | ................ | B05B 9/002 |
| | | | | 427/8 |
| 2016/0053739 A1 * | 2/2016 | Prill | ......................... | F03B 3/08 |
| | | | | 415/1 |
| 2016/0237984 A1 | 8/2016 | Hashimoto | | |
| 2016/0273511 A1 | 9/2016 | Huebner | | |
| 2016/0348641 A1 | 12/2016 | Jessamy | | |
| 2017/0082085 A1 | 3/2017 | Huebner | | |
| 2017/0317627 A1 * | 11/2017 | Bergman | ............... | F03B 17/063 |
| 2020/0244200 A1 * | 7/2020 | Bergman | ............... | F03B 15/16 |

\* cited by examiner

WATER POWERED MOTOR FOR PRODUCING USEFUL WORK

CROSS REFERENCE TO RELATED APPLICATIONS

The present application is a continuation-in-part of earlier filed Ser. No. 15/830,741, filed Dec. 4, 2017, entitled "Pontoon System For Producing Useful Work", which, in turn, was a continuation-in-part of earlier filed Ser. No. 15/170,346, filed Jun. 1, 2016, entitled "Waterwheel For A Waterwheel Energy System" by the same inventor.

BACKGROUND OF THE INVENTION

1. Field of the Invention

This invention relates generally to a new type of waterwheel used in a system for generating useful work. The waterwheel may be located above a water reservoir with a water pump that delivers water from the reservoir to a discharge manifold which discharges water to the waterwheel at an elevated location, whereby the waterwheel powers a drive shaft that is connected to a load.

2. Description of the Prior Art

Due to the limitations of non-renewable energy sources, such as oil and coal, as well as the negative environmental effects of such energy sources, a need exists for the provision of alternative energy conversion and transfer systems. At the present time, there is increasing interest in renewable energy sources such as water based, solar, wind, wave and tidal power.

The tremendous growth in renewable energy over the past several years is well documented and the rate of growth continues to increase each year. With worldwide awareness of the negative environmental impacts of fossil fuels on our global environment, growth in the use of "green" or renewable energy appears to be constrained only by the ability to produce and deliver it at an economic price. Wind power, for example, has now entered the mainstream and has been the fastest growing segment of the energy industry over the last several years. Despite the current movement supporting renewable energy sources, many legislators and policy-makers are attempting to meet these demands through projects which relate solely to wind and solar power generation, and do not address renewable energy produced from water.

Water engines are thermodynamic engines for converting the pressure and weight of water into work and have been widely recognized as efficient source of power. Examples include water turbines for generating electricity, and waterwheels for operating belts and drive shafts to turn machinery. In the case of the typical waterwheel, water from, for example, a river or stream or other natural waterway is used to fill a series of receptacles formed between a series of blades or vanes of a wheel-like structure. Imbalance resulting from the fill causes the wheel to rotate about its drive shaft, generating rotational force which may be coupled to other devices.

One aspect to be considered in evaluating the feasibility of a water engine is the availability of a relatively constant water source. For example, when driven by naturally flowing water sources, the quantity of water available to drive a turbine is often uncertain, dependent upon the changing seasons and varying climatic conditions. During a rainy season the amount and flow of water present may be too great for the turbine. Conversely, in a time of less rain fall or little water, insufficient water flow may be present for efficient operation of the turbine.

However, one common fixture of many farms and ranches is the presence of a water reservoir known as a "tank" or "stock tank." The stock tank can assume the form of a pond or small lake filled with water which is used to provide drinking water for animals such as cattle or horses, or which is used for irrigation, or other purposes.

One object of the present invention, therefore, is to provide a water turbine which can be positioned adjacent an existing pond, lake or tank, such as a "stock tank", and which can use the water from the reservoir to turn a drive shaft to produce useful work, as will be described more fully in the written description which follows. It is not necessary to have a source of naturally flowing water, as in the case of a river or stream as the water source.

SUMMARY OF THE INVENTION

The foregoing objects of the invention are met through the water driven system of the invention. The system has a number of operable components which are mounted on a frame which serves as an enclosure for components of the system. A waterwheel is carried within the frame in an upright manner on a horizontal rotational axis and has a plurality of water receiving elements for turning the waterwheel in response to a discharge of water against the water receiving elements. The frame has opposing side elements and oppositely arranged open ends.

The system also includes a water supply tank having an interior, an exterior, and a water discharge manifold communicating with the interior of the water supply tank. The water discharge manifold is disposed above the waterwheel in discharge alignment with the water receiving elements.

A water pump is provided for pumping water from an adjacent water reservoir to the interior of the water supply tank. Water which is pumped from the water reservoir flows from the supply tank through the water discharge manifold onto the water receiving elements as the elements turn within the waterwheel frame. Water is discharged from the water receiving elements as the elements move from a relatively higher rotational position to a relatively lower rotational position as the waterwheel rotates on its rotational axis. The water which is discharged from the water receiving elements as the elements turn exits one of the open ends of the frame and is allowed to flow back to the water reservoir under the force of gravity.

The waterwheel has a pair of spaced apart wheel shaped side plates each having an exterior surface and an interior surface, and wherein each of the side plates has an axle shaft welded thereon at a right angle to the exterior surface at a central location on each of the side plates. The axle shafts are each being mounted in a bearing structure on the frame for rotational movement with respect to the frame. The rotational movement of the axle shafts is used to power a motor for producing useful work.

In one preferred form, the water receiving elements of the waterwheel are comprised of a series of bent metal sheets which radiate outwardly from a central axis of the waterwheel and which are welded between the two side plates. Each bent metal sheet has a relatively longer inner extent and a relatively shorter outer extent which is bent at an angle with respect to a line drawn perpendicular to the plane of the inner extent. The relatively longer inner extent is joined to a substantially vertical back panel which, together with the inner and outer extents, forms a trough for receiving water from the water discharge manifold.

Preferably, the relatively shorter outer extent of each bent metal sheet is bent at an angle in the range from about 20 to 40° with respect to a line drawn perpendicular to the plane of the inner extent. More preferably the angle ("α" in FIG. 3) is in the range from about 25 to 35°, and most preferably the angle is approximately 30°. Each of the troughs can conveniently be formed by spot welding a relatively longer piece of metal and a relatively shorter piece of metal and a back panel to the respective side plates of the waterwheel in the bent shape previously described. In one preferred form, the longer piece of metal makes up approximately two thirds of the length of a bottom wall of each trough, the shorter piece making up the remaining approximate one third portion of the overall length. The troughs can be supported upon radiating sheets of metal (spokes) which radiate outward from the axis of the central shaft at equidistant locations about the axis. In a most preferred version of the system of the invention, the radiating sheets form a star shaped pattern approximately 72° apart about the axis of the central shaft and there are five water receiving troughs formed between the side plates of the waterwheel.

The water pump used in supplying water to the system can conveniently be mounted on a bed of a truck having a power take-off the power take-off being used to power the water pump. Preferably, the bed of the truck on which the pump is mounted is raised and lowered by a fifth wheel assembly of the truck, raising and lowering of the bed being used to properly position one end of the water pump at a correct depth in the water reservoir. The preferred water pump has a pump inlet and a pump outlet and can also have a by-pass valve located between the inlet and outlet for temporarily by-passing water from the pump back to the water reservoir.

As has been mentioned, the rotational movement of the axle shafts can be used to drive a hydraulic motor/pump which is used to produce useful work. A gear/sprocket/pulley type multiplier system can be used to create an increased rpm output for driving the hydraulic motor/pump. The waterwheel frame can also be provided as a portable skid which allows the system to be moved from one location to another.

One object of the present invention is thus to provide such a waterwheel based system which can compete economically with wind based energy generating turbine systems.

Another object of the invention is to provide a waterwheel system which can be driven by a conveniently located water source which allows a consistent output to be maintained, irrespective of variations in the flow of any nearby or distant natural rivers or moving water supplies.

Another object of the invention is to provide a waterwheel system with an improved waterwheel which more efficiently generates useful work than was possible with the known prior art devices.

Another object of the invention is to provide such a power generating system that can be operated without the need for highly trained staff and technicians to constantly maintain and support the associated equipment.

Additional objects, features and advantages will be apparent from the written description which follows.

DETAILED DESCRIPTION OF THE INVENTION

The present invention provides a water driven system for generating useful work which meets the foregoing objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 1:
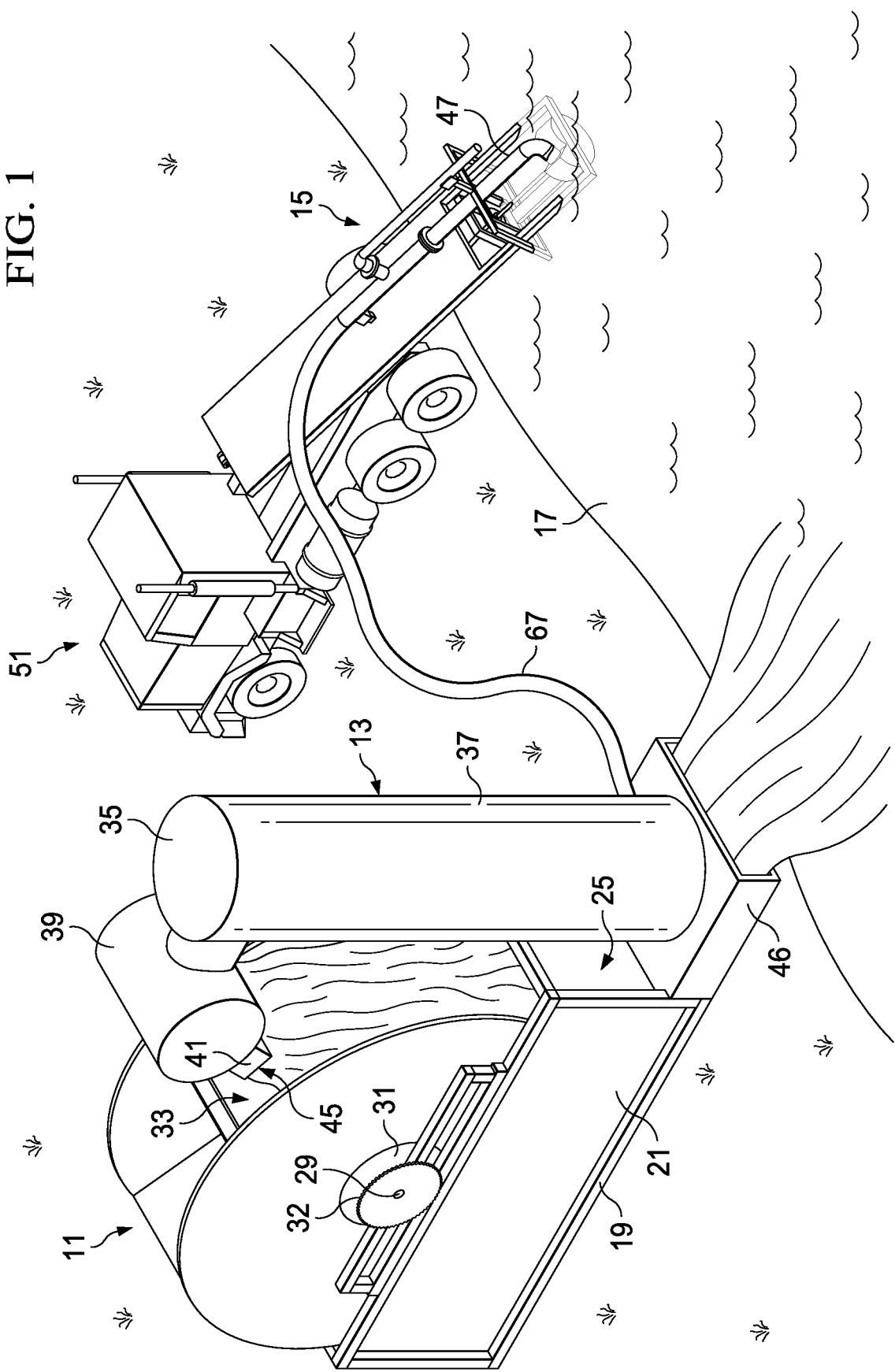
FIG. 1 is a simplified, partly schematic, of the water driven system for producing useful work of the invention.

FIG. 1 is a simplified, partly schematic view of the water powered motor and water delivery system. The principal components of the motor and system include a waterwheel 1, water supply tank 13, and a powered delivery source 15 for delivering water from an adjacent water reservoir 17 to the supply tank 13 and, in turn, to the waterwheel 11. In the example shown, the water reservoir 17 is, in this case, a farm pond or "stock tank" of the type found on many western ranches and the like. As briefly mentioned, a stock tank is used to provide drinking water for animals such as cattle or horses, or to irrigate fields, or the like. These tanks are typically filled either by a pump, windpump, creek, spring, or may rely on runoff water from rain or melting snow. There are thousands of water ponds in Texas rangelands that locals call a "tank".

Figure 2:
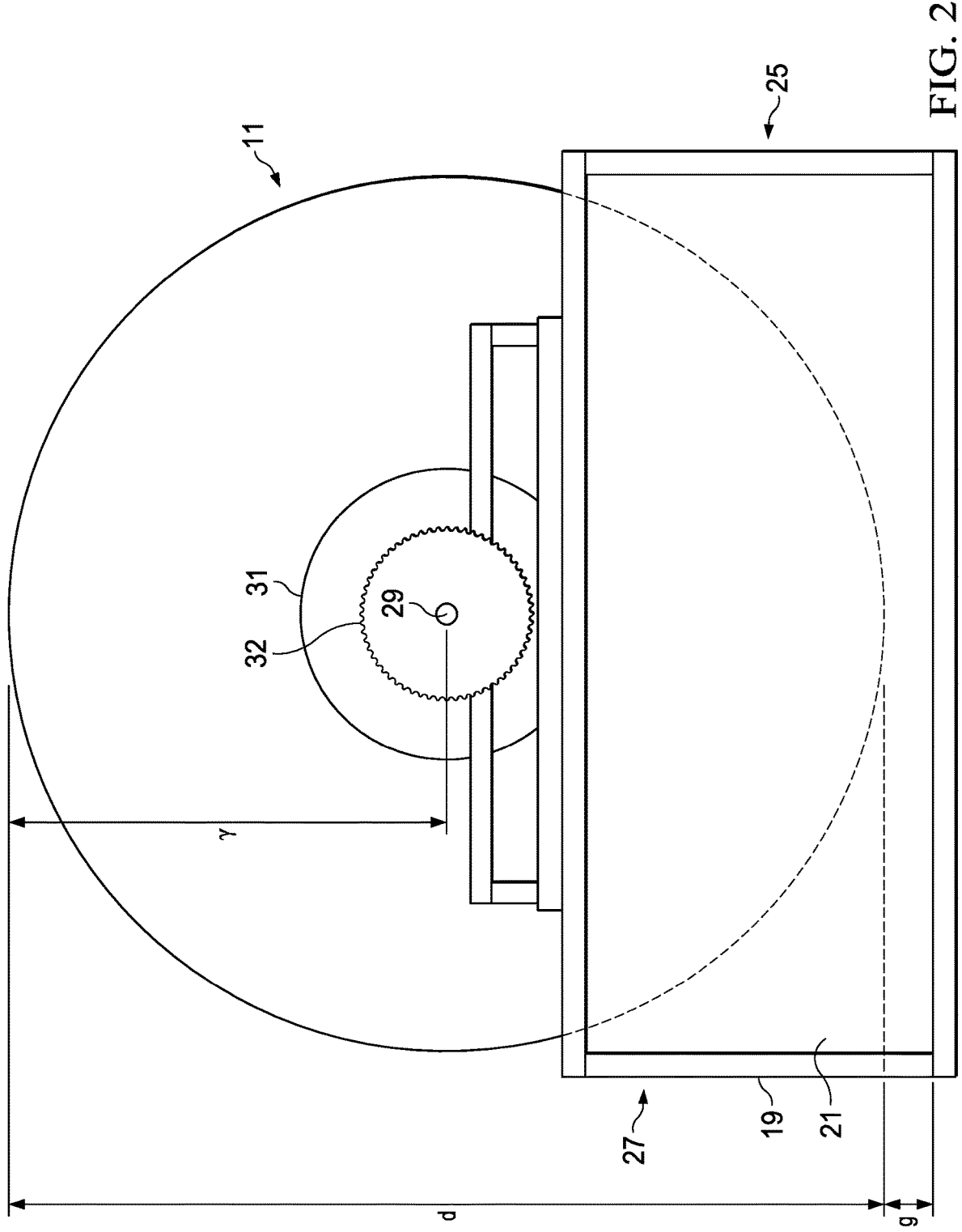
FIG. 2 is a simplified side view of the waterwheel and frame used as an enclosure in the water driven system of FIG. 1.
Figure 4:
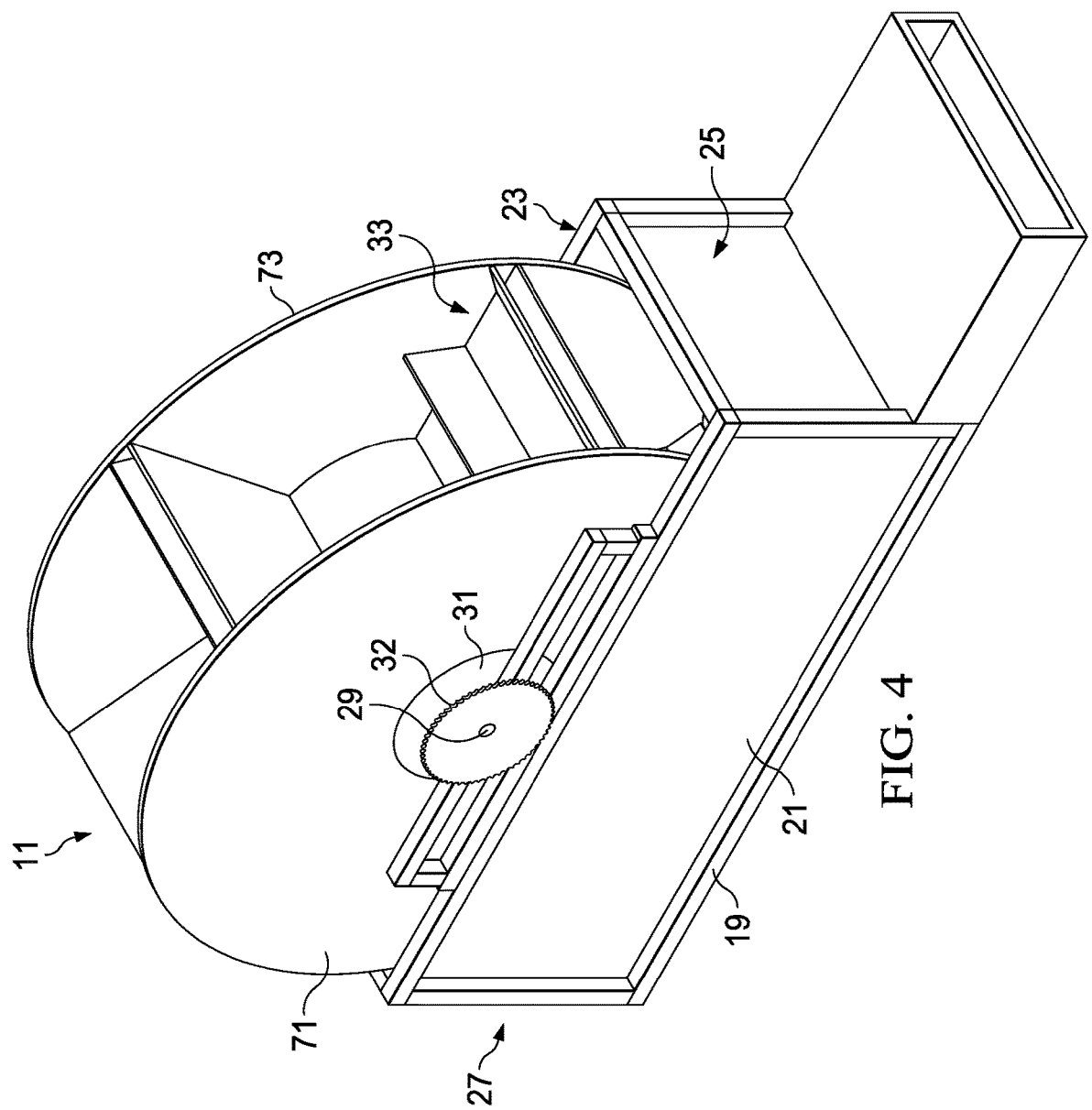
FIG. 4 is a simplified, perspective view of the waterwheel and wheel enclosure used in the water driven system of the invention.

The figures which follow explain the components of the water powered motor and water delivery system in greater detail. As shown in FIGS. 1 and 2, a frame 19 serves as an enclosure for the waterwheel 11. Perhaps as best seen in FIG. 4, the frame 19 has opposing side elements or panels 21, 23, and oppositely arranged, open ends 25, 27, respectfully. The waterwheel 11 is located within the frame 19 in an upright manner. In the example shown in FIG. 4, the wheel itself has outwardly extending axle shafts, such as shaft 29, mounted within a suitable bearing assembly 31, which allows the wheel to rotate about the horizontally oriented axle shafts 29. The waterwheel 11 has a plurality of water receiving elements, such as troughs 33 for turning the waterwheel in response to a discharge of water against the water receiving elements.

As briefly described with respect to FIG. 1, a water supply tank 13 is located adjacent the waterwheel 11. The water supply tank could assume a variety of forms. For example, the water supply tank 13 shown in FIG. 1 is a vertically standing, cylindrical tower having an interior 35, an exterior 37, and a water discharge manifold 39 communicating with the interior of the water supply tank. The discharge manifold 39 is disposed above the waterwheel 11 in discharge alignment with the water receiving elements 33. In the prototype system of the invention, the tank 13 is a 1000 gallon tank with a manifold 39 which is approximately 30 inches in diameter and about seven feet long. A discharge chute 41 is angled downwardly at about a 45° angle and may be equipped with a mechanically operated shutter or gate (shown form the end view as 45 in FIG. 1) which can be raised and lowered in increments to provide a degree of control over the flow of water leaving the supply tank 13 and passing downwardly to the waterwheel 11. The discharge manifold 39 and discharge chute 41 act as a "muffler" to reduce the water coming from the supply tank to manageable flow rates. For example, it is envisioned that a 1000 gallon supply tank will be able to supply on the order of 6,500 gallons per minute of water, if left unregulated. The discharge manifold and discharge chute also take the water discharge point down to a desired height where it is needed to impinge upon the water receiving elements of the waterwheel. The discharge manifold and/or discharge chute may be braced against the frame of the waterwheel for added stability.

Some sort of water supply system is necessary to provide a convenient source of water to the waterwheel. Preferably, the water being supplied to the system is handled only one time and is hydraulically powered, rather than posing the possible hazards of electrical power systems. As shown in FIG. 1, a truck mounted water pump 47 is used for pumping water from the adjacent water reservoir 17 to the interior 35 of the water supply tank 13. Water flows from the supply tank through the water discharge manifold 39 onto the water receiving elements 33 as the elements turn within the waterwheel frame 19. Since the frame of the waterwheel is open at either of the two opposing ends (25, 27), the water which is being discharged from the water receiving elements 33 as the elements turn is allowed to flow back to the water reservoir 17 under the force of gravity. The resulting rotational movement of the axle shafts 29 of the waterwheel is used to power a motor for producing useful work. As shown in FIG. 1, the water supply tank 13 may rest on a support platform 46 which raises the supply tank 13 at least about 12 to 16 inches above the floor of the waterwheel frame 19.

The truck mounted pump 47 is, in this case, an adapted field irrigation pump of the type normally used to irrigate agricultural fields. A suitable pump, modified for purposes of the invention, can be obtained, for example, from Gator Pump Company, P.O. Box 57, Brownwood, Tex. 76804. A typical commercially available water pump is sold commercially as the "Original Gator Agricultural PTO Trailer Pump." These general types of pumps are used for such diverse needs as high and low-volume pumping, de-watering flooded fields, managing tail water or supplying water to flood and furrow-irrigated farmlands.

Figure 5:
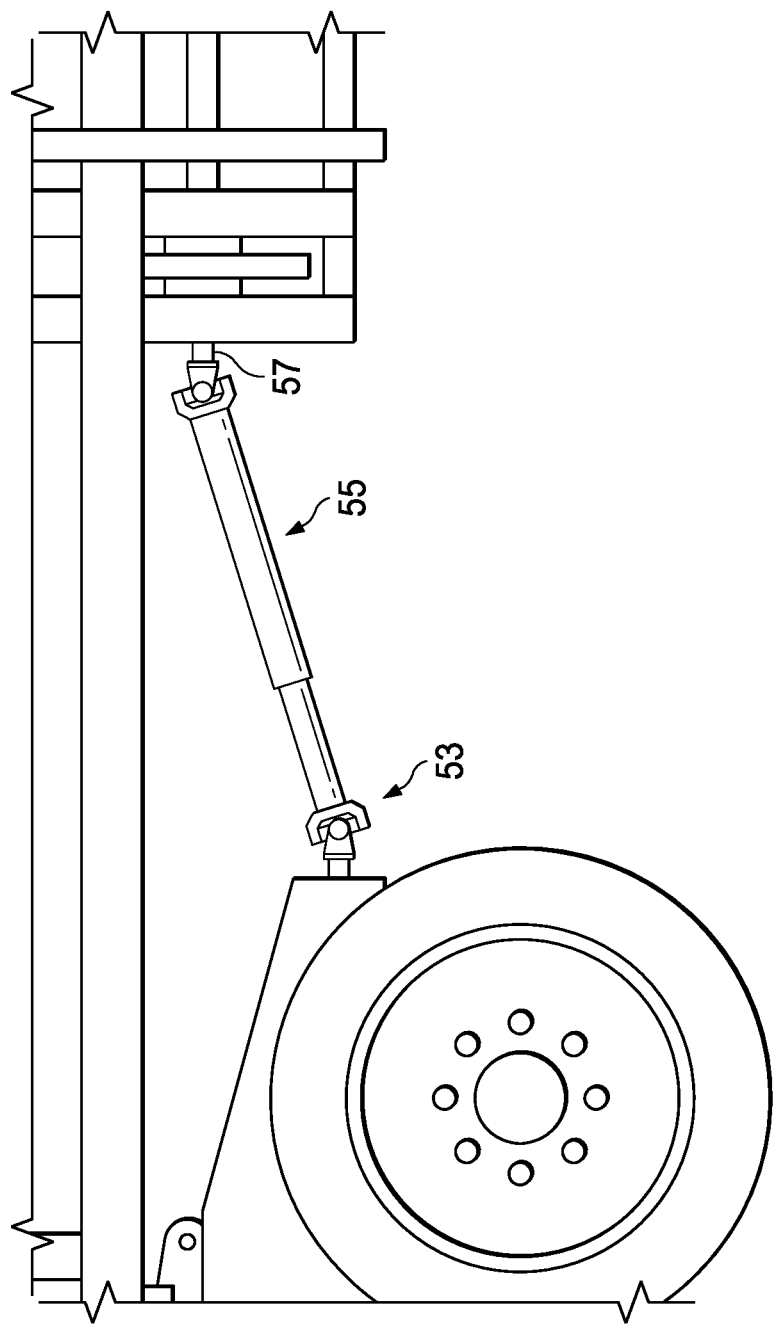
FIG. 5 is a cut-away view of the power take-off of the diesel tractor used to power the water pump used in the system of the invention.
Figure 6:
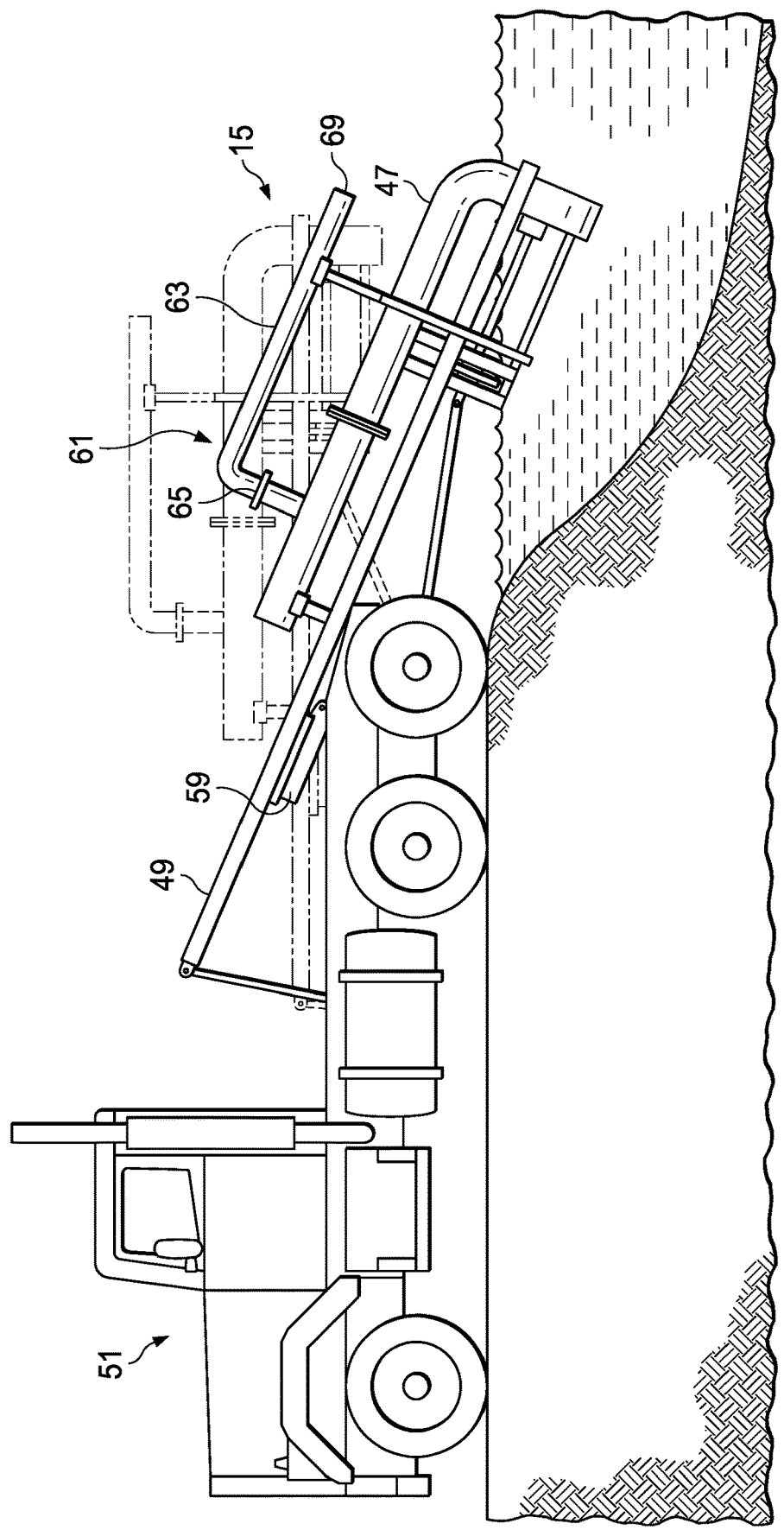
FIG. 6 is side view of the diesel tractor and bed-mounted water pump used in the system of the invention.

For purposes of the present invention, the original agricultural pump has been mounted in the tilting bed (49 in FIGS. 1 and 6) of a diesel tractor truck 51. In this case, the truck 51 comes equipped with a 300 h.p. power take-off, shown in simplified fashion generally at 53 in FIG. 5. Power take-offs of this type are commercially available and will be familiar to those skilled in the relevant arts. The power take-off from the diesel tractor is connected by a U-joint assembly 55 to the drive shaft 57 of the agricultural pump for powering the pump. The diesel tractor 51 is used to properly position the pump adjacent the water reservoir 17. The fifth wheel assembly (shown generally at 59 in FIG. 6) is used to raise and lower the bed of the truck on which the pump is mounted. This action is used to properly position one end of the water pump at a correct depth in the water reservoir 17. The fifth wheel assembly is also a commercial item that comes as standard equipment with the tractor 59 and will be familiar to those skilled in the art.

Because of the particular arrangement of the water delivery system, the pump 47 will run at the particular rpm the truck motor runs at, e.g., 500 to 1,000 rpm. In order to provide additional control over the water supply, a by-pass assembly (shown as 61 in FIG. 6) may be employed. In the example shown, the by-pass assembly is a 6 inch diameter pipe 63 equipped with a manually operated, quick opening butterfly valve 65 which can be manually set at a range of desired openings. The by-pass valve 65 allows the operator to shunt off a portion, or all of, for example a gallon/minute flow of water which would otherwise pass out the supply hose (67 in FIG. 1) which is used to supply water from the pump 47 to the supply tank 13. The supply hose 67 can be, for example, a 12 inch flexible rubber hose. The discharged water from the by-pass assembly flows out a discharge end 69 of the pipe 63 back to the water reservoir 17.

Figure 3:
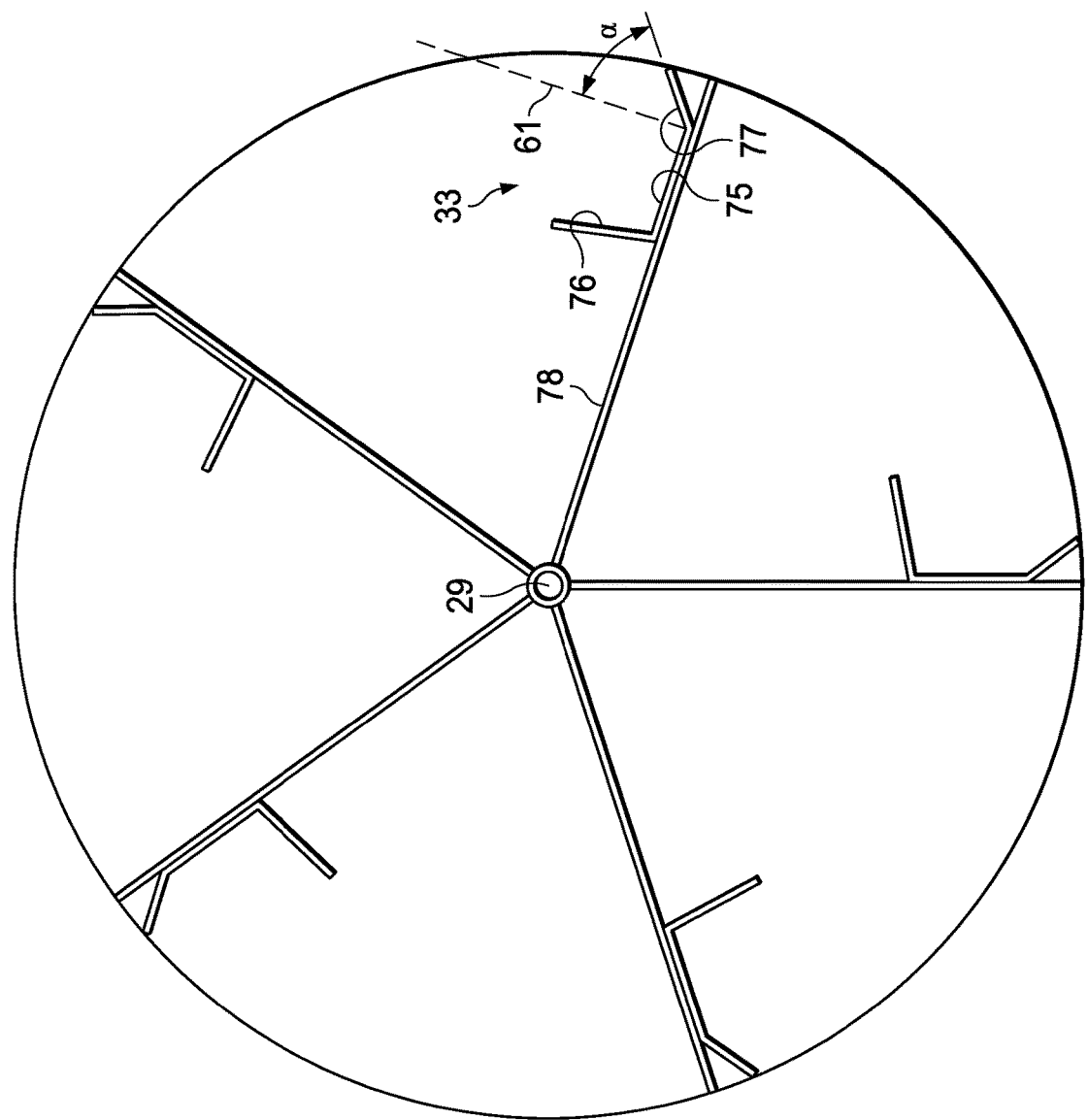
FIG. 3 is a side view of the waterwheel of FIG. 2 with one of the end plates removed for ease of illustration.

FIGS. 2, 3 and 4 show the preferred water wheel of the invention in greater detail. As perhaps best seen in FIG. 4, the waterwheel has a pair of spaced apart wheel shaped side plates 71, 73, each having an exterior surface and an interior surface, and wherein each of the side plates has an axle shaft (such as shaft 29 in FIG. 4) welded thereon at a right angle to the exterior surface at a central location on each of the side plates. The axle shafts are each being mounted in a conventional bearing structure 31 on the frame for rotational movement with respect to the frame 19. This allows the waterwheel to be rotatable about a horizontal axis aligned with the axle shaft with respect to the stationary frame 19. FIG. 2 is a schematic representation of the movement of the waterwheel 11 within the frame 19 showing the outer diameter of the waterwheel nearly touching the bottom of the frame between the opposing open frame ends 25, 27 (see FIG. 4).

With reference now to FIG. 3, the water receiving elements 33 of the waterwheel 11 are comprised of a series of bent metal sheets which radiate outwardly from a central axis of the waterwheel made up by the axle 29. The bent metal sheets can be welded between the two side plates 71, 73 (FIG. 4), each bent metal sheet having a relatively longer inner extent 75 and a relatively shorter outer extent 77 which is bent at an angle "α" with respect to a line drawn perpendicular to the plane of the inner extent 75. The relatively longer inner extent 75 is joined to a substantially vertical back panel 76 which, together with the inner and outer extents forms a trough receiving water from the water discharge manifold (39 in FIG. 1).

In the version of the waterwheel shown in FIG. 3, each of the trough bottom walls (such as wall 75) has an outer extent which is bent at an angle in the range from about 20 to 40°, preferably from about 25 to 35°, most preferably about 30°, from the plane of the inner extent thereof. In other words, the bottom wall 75 in FIG. 3 is bent at an angle "α" which in this case happens to be approximately 30° with respect to the imaginary line 61. The trough can conveniently be formed by spot welding a longer piece of metal 75 and a relatively shorter piece of metal 77 and a back panel 76 at the locations shown in FIG. 3. The longer piece 75 is approximately two thirds of the total length of the bottom wall, with the angled, shorter piece 77 making up the remaining approximate one third portion of the overall length. The troughs can be supported upon radiating sheets of metal (spokes) 78 which radiate outward from the axis 29 of the central shaft at approximately equidistant locations about the axis 29. The radiating sheets 78 form a star shaped pattern approximately 72° apart about the axis of the central shaft 37. In this version of the waterwheel of the invention, there are five buckets or troughs. The particular arrangement and shape of the trough bottom walls shown in FIG. 3 help to eliminate any tendency of the waterwheel to move in a backward direction in operation and provide increased efficiency for transmitting and converting the power generated by the turning waterwheel into useful work.

It is envisioned that, to produce useful work in an economical fashion to compete with, for example, a wind turbine, the production version of the waterwheel 11 will be quite massive in design. For example, one early prototype waterwheel was constructed which was 10 feet in diameter and 6 feet in width, weighing approximately 10,000 pounds. For the troughs on the prototype, a 6 foot wide sheet of metal was bent in a brake to have a front lip or edge 22 inches tall. The trough was formed with a 53 inch pan depth and with a 3 inch back lip or edge giving the trough a rectangular appearance. The holding capacity of the prototype waterwheel was about gallons with 70-80% of all the troughs being full at any given time during the rotation of the waterwheel.

Another prototype waterwheel is being constructed, as shown in FIG. 2, which will be 30 feet in diameter ("d" in FIG. 2), meaning a radius of 15 feet ("r" in FIG. 2). The bottom of the waterwheel comes almost to the floor of the waterwheel frame 19, leaving a gap "g" of only about inches. However, a much larger diameter waterwheel, i.e., 40, 50, 60, etc., feet or more in diameter, would have a much larger water trough holding capacity.

The rotational movement of the waterwheel and corresponding movement of the axle shafts 39 can be used to produce useful work, e.g., to drive an electrical generator for generating electrical power. While many such systems might be utilized in the generation of electricity, there are many other useful applications, as well. For example, the previously mentioned use of such systems to operate belts and drive shafts to turn machinery. It is possible that a conventional electrical generator might be mounted directly on the frame and be driven by the waterwheel to generate electrical power by one of the axle shafts of the waterwheel. However, in some versions of the invention, the frame 19 will also have mounted thereon a hydraulic pump, driven by the waterwheel axle shaft, which is used to drive a hydraulic motor, the hydraulic motor, in turn, being used to drive the electrical generator for generating electrical power. The hydraulic motor and pump may also be incorporated in one commercially available unit. The hydraulic motor/pump and electrical generator might even sit beside the frame, or at another more distant location. In some cases, it may be desirable to have a gear/sprocket/pulley system attached to the sprocket output gear (32 in FIGS. 1, 2 and 4) located between a selected one of the axle shafts of the waterwheel and the hydraulic motor/pump for creating an increased rpm output for driving the hydraulic motor/pump. This might comprise a suitable gear, sprocket or pulley multiplier type system, such as a gear box located between a selected one of the axle shafts of the waterwheel and the hydraulic pump/motor for creating an increased rpm output for driving the hydraulic pump/motor. The system could also be simplified, as by going from a sprocket on the main shaft to a transmission, using a chain or other means. This would eliminate the need for pulleys and belts.

A suitable multiplier system, for example, could be used to transform the 10-12 rpm rotational speed of the waterwheel to approximately 1800 rpm's at the hydraulic motor/pump drive shaft. The hydraulic motor/pump can then be used to produce useful work, one example being to drive an electric generator in conventional fashion. It should then be economically feasible; for example, to drive a 200-300 Kwatt generator of the type currently driven by wind powered sources, and the like.

An invention has been shown with several advantages. The water driven system of the invention uses water as the motive force for creating useful work. One application of the work produced by the system is to generate electricity, rather than using polluting fuels such as burning fossil fuels. This system is extremely simple in design and economical to manufacture. The waterwheel frame can be provided as a portable skid which allows the system to be moved from one location to another. The design of the waterwheel used in this version of the water driven system is particularly efficient in converting the energy of the moving water to useful work. This system of the invention thus provides a relatively inexpensive power generating system that can be used to generate a variety of forms of useful work as a water powered motor and the like.

While the invention has been shown in several of its forms, it is not thus limited but is susceptible to various changes and modifications without departing from the spirit thereof, as described in the claims which follow.

What is claimed is:

1. A truck powered system for producing useful work by pumping water from an adjacent static water reservoir to a waterwheel, the tack powered system comprising:
   a frame serving as an enclosure for the waterwheel, the frame having opposing side elements and oppositely arranged, open ends;
   and wherein the waterwheel is carried within the frame in an upright manner and has a plurality of water receiving elements for turning the waterwheel in response to a discharge of water against the water receiving elements;
   a separate and space apart water supply tank having an interior, an exterior, and a water discharge manifold communicating with the interior of the water supply tank, the discharge being disposed above the waterwheel in discharge alignment with the water receiving elements;
   a truck mounted water pump which allows the water pump to be positioned beside the adjacent water reservoir, the water pump being powered by a power take-off of the truck on which the pump is mounted, the water pump being used for pumping water from the adjacent water reservoir to the interior of the water supply tank, water flowing from the supply tank through the water discharge manifold onto the water receiving elements as the elements turn within the waterwheel frame, the water which is being discharged from the water receiving elements as the elements turn being allowed to flow back to the adjacent water reservoir under the force of gravity;
   wherein the truck has a truck bed and wherein the water pump has a water inlet and a water outlet and wherein the water pump is pivotally mounted on the-truck bed at a pivot point which allows the water inlet to be positioned with the water inlet at a desired depth in the water reservoir to accommodate changes in the depth of the reservoir over time;

wherein the bed of the truck on which the pump is mounted is raised and lowered about the pivot point by a fifth wheel assembly of the truck, lowering of the bed being used to properly position the inlet end of the water pump at the desired depth in the water reservoir;

wherein the waterwheel has a pair of spaced apart wheel shaped side plates each having an exterior surface and an interior surface, and wherein each of the side plates has an axle shaft welded thereon at a right angle to the exterior surface at a central location on each of the side plates, the axle shafts each being mounted in a bearing structure on the frame for rotational movement with respect to the frame, the waterwheel carrying a series of troughs for receiving water from the water discharge manifold of the water supply tank;

wherein the waterwheel is at least 10 feet in diameter and 6 feet in width and has a holding capacity of at least 2848 gallons with 70 to 80% of the troughs at any given time during the rotation of the waterwheel;

wherein the weight of water in the troughs of the waterwheel is used to leverage the force applied to the axle of the waterwheel, rotational movement of the axle being used to produce useful work.

2. The truck powered system of claim 1, wherein the troughs are supported on outwardly radiating metal elements which form spokes of the waterwheel in a star shaped pattern 72° apart about the axis of the central shaft.

3. The powered system of claim 1, wherein there are five water receiving troughs formed between the side plates of the waterwheel.

4. The truck powered system of claim 1, wherein a by-pass valve is located between the water pump inlet and outlet for temporarily by-passing water from the pump back to the water reservoir.

5. The truck powered system of claim 1, wherein the waterwheel frame is mounted on a portable skid which allows the system to be moved from one location to another.

6. The truck powered system of claim 1, wherein the waterwheel is at least 30 feet in diameter.

7. A method for producing useful work using a truck powered pump by pumping water from an adjacent static water reservoir, the method comprising the steps of:

providing a frame serving as an enclosure for a waterwheel, the frame having opposing side elements and oppositely arranged, open ends;

locating a waterwheel within the frame in an upright manner, the waterwheel having a plurality of water receiving elements for turning the waterwheel in response to a discharge of water against the water receiving elements;

providing a separate and spaced apart water supply tank located adjacent the waterwheel, the water supply tank having an interior, an exterior, and a water discharge manifold communicating with the interior of the water supply tank, the discharge being disposed above the waterwheel in discharge alignment with the water receiving elements;

wherein the waterwheel frame and water supply tank are mounted on a movable skid which allows them to be moved to a location adjacent the water reservoir;

providing a truck mounted water pump which allows the water pump to be positioned beside the adjacent water reservoir, the water pump being powered by a power take-off of the truck on which the pump is mounted, the water pump being used for pumping water from the adjacent water reservoir to the interior of the water supply tank, water flowing from the supply tank through the water discharge manifold onto the water receiving elements as the elements turn within the waterwheel frame, the water which is being discharged from the water receiving elements as the elements turn being allowed to flow back to the water reservoir under the force of gravity;

wherein the truck has a truck bed and wherein the water pump has a water inlet and a water outlet and wherein the water pump is pivotally mounted on the truck bed at a pivot point which allows the water inlet to be positioned with the water inlet at a desired depth in the water reservoir to thereby accommodate changes in depth of the adjacent water reservoir;

wherein the rotational movement of the axle shafts is used for producing useful work.

8. The method of claim 7, wherein the waterwheel has a pair of spaced apart wheel shaped side plates each having an exterior surface and an interior surface, and wherein each of the side plates has an axle shaft welded thereon at a right angle to the exterior surface at a central location on each of the side plates, the axle shafts each being mounted in a bearing structure on the frame for rotational movement with respect to the frame.

9. The method of claim 7, wherein the bed of the truck on which the pump is mounted is raised and lowered about the pivot point by a fifth wheel assembly of the truck, lowering of the bed being used to properly position one end of the water pump at a correct depth in the water reservoir.

* * * * *